July 9, 1963 C. BARON 3,096,599

REMOVABLE FISHING SINKER

Filed July 3, 1958

Inventor
Charles Baron
by Ernest G. Montague
attorney

United States Patent Office 3,096,599
Patented July 9, 1963

3,096,599
REMOVABLE FISHING SINKER
Charles Baron, 34 Rue Trevet, Aubervilliers, France
Filed July 3, 1958, Ser. No. 746,552
Claims priority, application France July 6, 1957
1 Claim. (Cl. 43—44.9)

The present invention relates to fishing sinkers, and more particularly to sinkers used in cast fishing with rods equipped with a reel.

When it is desired to remove a conventional sinker from a line and to substitute therefor another sinker of different weight or of different type, it is necessary to sever the line near the sinker and to attach a new one at the end of the remaining part of the line. Also when it is desired to wind up the line completely on the reel, for instance in order to change it, it is also necessary to cut the line near the sinker because the latter is bigger than the guiding rings secured to the rod and in which the line is threaded. Such cutting operations, obviously, are a nuisance, a source of waste of time and waste of line thread since, every time, the end portion of the line has to be thrown away.

One object of the invention is to provide a sinker of a new structure which is very simple and readily removable and interchangeable without it being necessary to cut the line.

Another object of the invention is to provide a new sinker formed by an assembly of several elements so designed that, subsequent to removal of the sinker proper, the elements remaining engaged on the line do not prevent or hinder complete rewinding of the line on the reel.

A further object of the invention is to provide a new sinker formed by an assembly of several elements so designed that they all may be removed from the line and allow complete rewinding of the latter without it being necessary to cut the end thereof.

Still a further object of the invention is to provide a new sinker which may be readily removed and substituted without it being necessary to cut the line thread and which may be mounted on the line either for free sliding movement on it or in fixed position relative thereto.

To the end that the foregoing objects may be attained, a fishing sinker according to the invention has an axial bore and a longitudinal slot for insertion over a line, a sleeve being releasably driven into said bore and having itself a bore to freely receive the fishing line on which it is threaded. In this manner, the sinker may be readily released from the line by axial sliding movement away from the sleeve followed by lateral movement away from the line thread through the slot.

According to another feature of the invention, the sleeve also has a slot in order to be possibly released from the line together with the sinker proper.

These and other objects of the invention will become apparent to those skilled in the art from the following description, taken in connection with the accompanying drawings in which:

FIG. 11a is a transverse section made on line XIa—XIa of FIG. 11.

The embodiment of fishing sinker illustrated in FIGS. 1 to 5 inclusive comprises a body or sinker proper 1 and a sleeve 2.

In this example, the body 1 is made of a heavy metal, while the sleeve 2 is made of a light material such as plastic material for instance.

Figure 1:
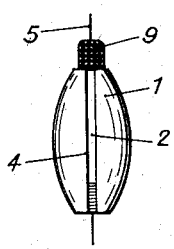
FIG. 1 is an elevation view of one embodiment of a sinker according to the invention.
Figure 6:
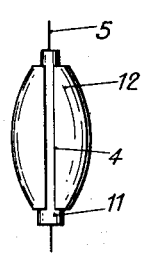
FIGS. 6, 11 and 16 are elevation views of three further embodiments, respectively, of sinkers, according to the invention.
Figure 11:
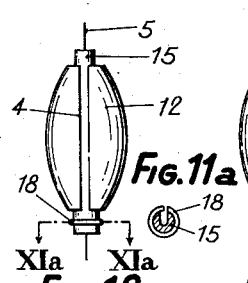
Figure 16:
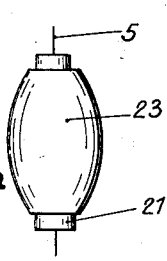
Figure 2:
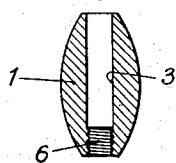
FIG. 2 is an axial section made on line II—II of FIG. 3 of the sinker proper or body alone of FIG. 1.
Figure 7:
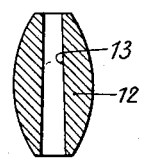
FIGS. 7, 12 and 17 are corresponding axial sections of the bodies alone, respectively.
Figure 12:
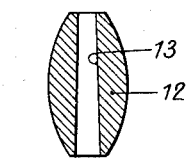
Figure 17:
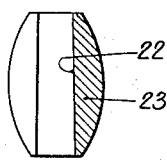
Figure 3:
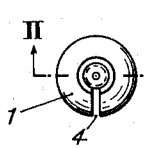
FIG. 3 is a top plan view of FIG. 1.
Figure 8:
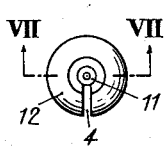
FIGS. 8, 13 and 18 are corresponding top plan views.
Figure 13:
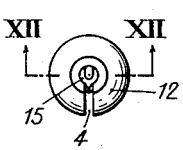
Figure 18:
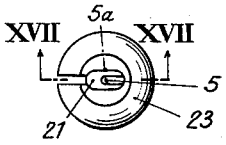
Figure 4:
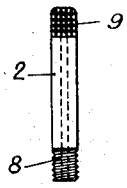
FIG. 4 is an elevational view of the sleeve alone of the assembly of FIG. 1.
Figure 9:
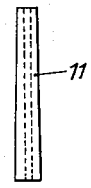
FIGS. 9, 14 and 19 show the corresponding sleeves alone, respectively.
Figure 14:
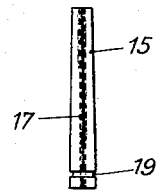
Figure 19:
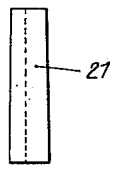
Figure 5:
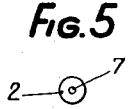
FIG. 5 is a top plan view of FIG. 4.
Figure 10:
FIGS. 10, 15 and 20 are top plan views of FIGS. 9, 14 and 19, respectively.
Figure 15:
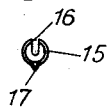
Figure 20:
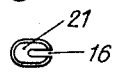

The body 1 has an axial cylindrical bore 3 and a longitudinal slot 4 the cross-section of which extends laterally from said bore to the outer surface of the body. The slot 4 is narrower than the diameter of the bore 3 and wider than the thickness of a fishing line 5 to be inserted through said slot. One end of the bore 3 is screw-threaded as indicated at 6 (FIG. 2).

The sleeve 2 has a cylindrical outer surface of a diameter substantially equal to that of the bore 3 of the body. It also has an axial bore 7 wider than the line 5 so that the latter may run freely in said bore 7. One end of the sleeve 2 is formed with a screw-thread 8 adapted to mesh in the screw-threaded portion 6 of the body 1. The other end of the sleeve 2 is knurled as indicated at 9 on FIGURE 4, so that it may be easily rotated by hand.

The operation of the sinker is as follows:

Assuming that the line 5 is already threaded in the bore 7 of the sleeve 2, that the body 1 is threaded over the sleeve 2 and tightened thereon by the engagement of the corresponding aforesaid screw-threaded portions, and that it is desired to release the sinker body 1 from the line, it suffices to unscrew the body 1 from the sleeve, to shift it axially away from said sleeve and, then, to move it laterally away from the line 5 being passed through the slot 4 of the sinker body 1.

Of course, the same sinker body, or another one of similar construction but possibly of different weight or outer configuration, may be mounted on the sleeve 2 by the reverse operations. It is readily understood that the sinker may be removed without it being necessary to cut the line thread 5.

In the modification illustrated in FIGS. 6 to 10, the sleeve 11 and the body 12 are clamped together by the reason that the outer surface of the sleeve and the bore 13 of the body are both tapering correspondingly. The operation of this sinker is similar to that of the first embodiment hereinabove described with the difference that, instead of a screw-thread clamping, a jamming action is obtained upon driving the body 12 forcedly over the conical sleeve 11.

In the modification illustrated in FIGS. 11 to 15 inclusive, the sleeve 15 is also conical and has a longitudinal slot 16 wider than the thickness of the line 5 and the cross-section of which extends laterally from the axial bore of the sleeve to the outer surface thereof.

The operation of this embodiment is similar to that of FIGS. 6–10 with the difference that, upon removing the body 12, the sleeve 15 also may be removed from the line 5 by passing the latter through the longitudinal slot 16 of the sleeve. Of course, when the body is secured to the sleeve, the slots of the body and of the sleeve, respectively, should be angularly offset as shown on FIG. 13 in order to prevent the line from escaping out of the assembly.

In order to position and lock the sleeve in correct angular position with respect to the body, there is shown, in the embodiment of FIGURES 11–15, a longitudinal rib 17 extending along the sleeve 15 opposite the slot 16, This rib 17 is intended to engage the portion of the slot 4 of the body which opens into the bore of said body.

Furthermore, there is also shown a split reinforcing ring 18, made for instance of metal and set in an annular groove 19 cut in the outer surface of the sleeve 15 near the bigger end thereof. The line may be threaded into the split ring or taken thereat by being passed between the two adjacent ends of said ring which are positioned in register with the longitudinal slot 16 of the sleeve.

In the three embodiments hereinabove described, the sleeve is circular in cross-section, whereas in the last embodiment illustrated in FIGS. 16 to 20, the sleeve 21 has a non-circular cross-section and the bore 22 of the body 23 has a mating cross-section. The particular shape of these cross-sections provides for the angular positioning and locking of the sleeve relative to the body in order that the two slots be maintained out of register for preventing the line from escaping out of the sinker.

In the embodiments where the sleeve has no slot, the outer diameter of the sleeve is preferably smaller than the inner diameter of the guiding rings of conventional rods designed for cast fishing and provided with a reel, so that said sleeve is able to pass through said guiding rings together with the line being wound on the reel and that it is possible to wind the line completely on the reel, subsequent to removal of the sinker without it being necessary to cut the end of the line thread.

In the case where the sleeve has a slot, it may be removed from the line and therefore does not interfere with complete winding of the line on the reel.

It has been stated hereinabove that the sleeve may slide freely over the line 5, but it should be noted that it is also possible to mount the sinker of the invention on the line in fixed relation thereto. For this purpose, it is sufficient to insert and jam the thread line 5a (FIG. 18) between the sleeve and the sinker body on portions thereof located out of their slots.

As many changes could be made in the above construction and many widely different embodiments of this invention could be made without departing from the scope of the claim, it is intended that all matter contained in the above description or shown in the accompanying drawings shall be interpreted as illustrative and not in a limiting sense.

Thus the slot of the sinker body and/or of the sleeve, instead of being rectilinear, as represented in the drawings, may assume any other suitable configuration such as, for instance, a helix.

What is claimed as new and desired to be secured by Letters Patent is:

A fishing line sinker for easy connection on and removal from a fishing line, said sinker comprising a heavy body member having a central bore of substantially conical configuration provided throughout the length thereof and a lateral slot extending along the entire length thereof, said lateral slot opening into said central bore to allow said body member to be placed over as well as removed from said fishing line laterally thereof, and a light sleeve member having a substantially conical configuration complementary to that of the conical configuration of said central bore so that said sleeve member makes a friction fit along the entire length of said central bore when disposed therewithin, said sleeve member having a central longitudinal opening therethrough and a longitudinal slot extending the full length thereof, said longitudinal slot communicating with said longitudinal opening and both having a diameter greater than said fishing line so that said sleeve member can be placed over as well as removed from said fishing line laterally thereof, said sleeve member including a longitudinal rib disposed along the entire length of the outer surface of said sleeve member and being angularly displaced in relation to said longitudinal slot of said sleeve member, said longitudinal rib having the same diameter throughout its disposition along said sleeve member, said longitudinal rib entering said lateral slot of said body member when said sleeve member is placed in said central bore to prevent any angular displacement of said sleeve member therein as well as to provide substantially uniform engagement therealong, said sleeve member including a base portion, said body member and sleeve member being mounted on said fishing line so that said base portion of said sleeve member is directed towards the end of the fishing line to which a fishing hook is connected.

References Cited in the file of this patent

UNITED STATES PATENTS

| | | |
|---|---|---|
| 419,574 | Vasseur | Jan. 14, 1890 |
| 668,254 | Dickinson | Feb. 19, 1901 |
| 2,315,048 | Croft | Mar. 30, 1943 |
| 2,534,790 | Moore | Dec. 19, 1950 |
| 2,582,619 | Blockinger | Jan. 15, 1952 |
| 2,651,132 | Lennen | Sept. 8, 1953 |
| 2,779,340 | Mansfield | Jan. 29, 1957 |

FOREIGN PATENTS

| | | |
|---|---|---|
| 305,050 | France | Feb. 15, 1955 |